United States Patent [19]

Pettersson

[11] Patent Number: 4,564,352
[45] Date of Patent: Jan. 14, 1986

[54] APPARATUS FOR COMPENSATING AXIAL STRAIN IN AN ISOSTATIC PRESS

[75] Inventor: Ola Pettersson, Höganäs, Sweden

[73] Assignee: KB Cold Isostatic Press Systems CIPS, Höganäs, Sweden

[21] Appl. No.: 699,500

[22] Filed: Feb. 8, 1985

Related U.S. Application Data

[63] Continuation of Ser. No. 548,082, Nov. 2, 1983, abandoned.

[30] Foreign Application Priority Data

Nov. 9, 1982 [SE] Sweden ............................. 8206359

[51] Int. Cl.$^4$ ......................... B30B 5/02; B30B 11/02
[52] U.S. Cl. .............................................. 425/405 H
[58] Field of Search .................................... 425/405 H

[56] References Cited

U.S. PATENT DOCUMENTS

| | | | |
|---|---|---|---|
| 3,608,026 | 9/1971 | Isaksson | 425/405 H |
| 3,832,100 | 8/1974 | Baxendale | 425/405 H |
| 3,832,103 | 8/1974 | Bewles | 425/405 H |
| 3,956,452 | 5/1976 | Saito | 264/314 |
| 4,046,499 | 9/1977 | Saito | 425/405 H |
| 4,056,347 | 11/1977 | Trolle | 425/405 H |
| 4,330,251 | 5/1982 | Lebas et al. | 425/DIG. 44 |

Primary Examiner—J. Howard Flint, Jr.
Attorney, Agent, or Firm—Burns, Doane, Swecker & Mathis

[57] ABSTRACT

An isostatic press acts against a molding tool (4,5,11,12,32,33) enclosed in the pressing chamber of the press, the cavity (4) of the press tool being defined in the press by an enveloping wall (5) of an elastomeric material and two end walls (11,33) meeting the enveloping wall (5). The dry pressing chamber of the press is defined by a radially deformable elastomeric jacket (6) exercising pressure against the enveloping wall (5) of the molding tool, and two press end structures (2,3) meeting the pressing chamber jacket (6) and carrying the end walls (33,11) of the molding tool. At least one end wall (33,11) is carried by an adjacent end structure (3,2) via an elastomeric element (31). The elastomeric element is disposed with its peripheral edge exposed against, and lying adjacent the deformable elastomeric jacket (6) of the pressing chamber. When the press is pressurized, the jacket (6) will press radially against the elastomeric element (31) such that the latter is axially expanded, thereby compensating for the axial strain of the press frame.

16 Claims, 1 Drawing Figure

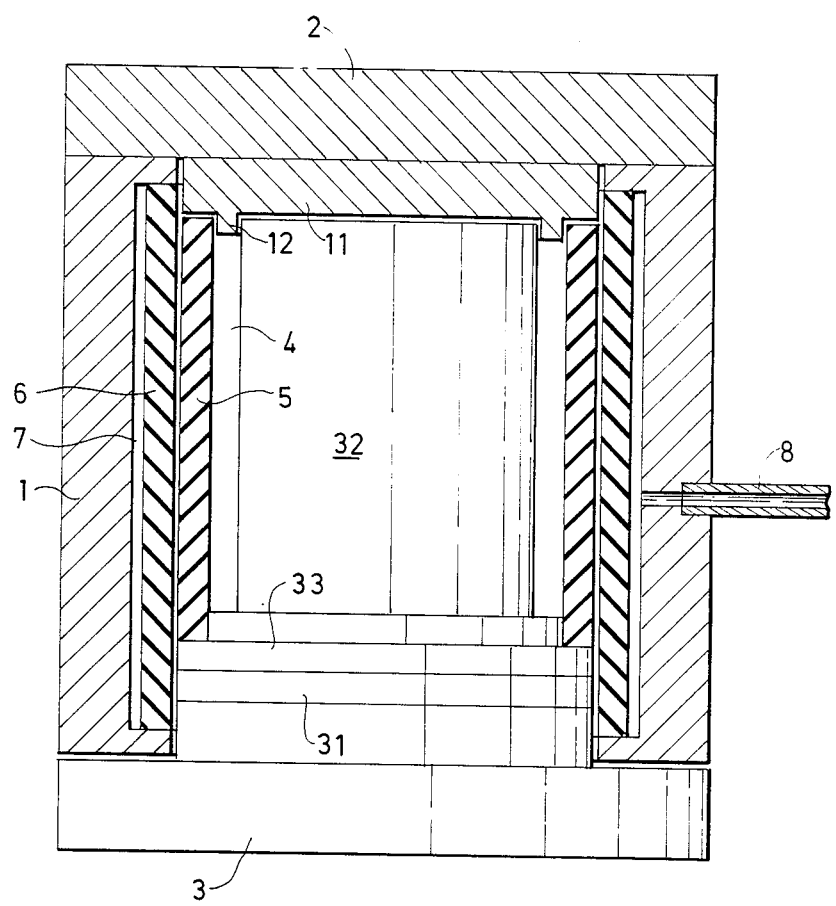

APPARATUS FOR COMPENSATING AXIAL STRAIN IN AN ISOSTATIC PRESS

This application is a continuation of application Ser. No. 548,082, filed Nov. 2, 1983, now abandoned.

TECHNICAL FIELD

The invention relates to an apparatus for compensating the axial strain in an isostatic press when under pressure, said press acting against a moulding tool enclosed in the pressing chamber of the press, the moulding cavity of the tool being defined in the press by an enveloping wall of an elastomeric material and two end walls meeting the enveloping wall, the dry pressing chamber of the press being defined by a radially deformable elastomeric jacket exerting pressure against the enveloping wall of the moulding tool, there being two press end structures carrying the end walls of the moulding tool.

BACKGROUND ART

Isostatic presses with dry pressing chambers, particularly large such presses, are to advantage implemented in the form of a hollow cylindrical wall with one fixed and one removable end structure, the removable structure facilitating the insertion and withdrawal of a moulding tool. The inner jacket of the press wall is an elastomeric material behind which there is arranged a hydraulic chamber, which can be put under pressure. The moulding tool includes an elastomeric jacket which is contiguous to the press wall, or jacket in the press, and two end walls carried by end structures of the press.

When the hydraulic chamber of the press is put under pressure, forces are exerted which cause axial strain in the press. The moulding cavity of the tool will also be axially elongated and displaced in position relative a core possibly arranged therein. This results in that the powder mass being pressed experiences an axially uncontrolled movement relative the tool, whereby the pressed body can be damaged, be given an indeterminate axial length and be given a non-uniform inner structure. It should be particularly noted that plants of the mentioned type more accurately generate semi-isostatic pressure, since the pressing forces act in the normal plane to the axial direction of the pressing chamber and of the tool, the end walls thus providing reaction forces towards the powder shift developed in an axial direction. The axial strain of the press is therefore particularly unfavourable.

The problem is particularly pronounced when the tool includes a fixed member or core, which defines a moulding cavity together with the enveloping wall of the tool.

OBJECTS

One object of the invention is to propose an apparatus compensating for the axial strain of the press during pressurization, thus reducing the mentioned drawbacks. A further object is to provide an apparatus which overcompensates the axial strain so that the end walls approach each other and exercise an active axial pressure on the moulded body.

CHARACTERIZATION OF THE INVENTION

The invention relates to an apparatus for compensating the axial strain in an isostatic press during pressurization, where the press acts against a moulding tool enclosed in the pressing chamber, the cavity of the moulding tool being defined in the press by an enveloping wall of an elastomeric material and two end walls connecting up with the enveloping wall, the dry chamber of the press being defined by a radially deformable, elastomeric jacket exercising pressure against the enveloping wall of the moulding tool, and two press end structures meeting with the jacket and carrying the end walls of the moulding tool. The apparatus is essentially distinguished in that at least one end wall is carried by an adjacent end structure via an elastomeric element, and in that the elastomeric element is disposed with its peripheral edge exposed against and lying adjacent the deformable elastomeric jacket of the press. One end structure of the press and the elastomeric element may constitute parts of the moulding tool. The moulding tool is preferably removable from the pressing chamber for being filled with powder or for the removal of formed bodies. The other end structure of the press is preferably rigidly connected to the press jacket, one end wall of the moulding tool being suitably mounted on the fixed end structure of the press. Alternatively, or furthermore, the elastomeric element or a second elastomeric element may be disposed between the fixed end structure and the mould end wall associated therewith. In the case with a single elastomeric element, this is suitably dimensioned for being subjected to an axial elongation or pressurizing the press jacket corresponding to the actual strain produced in the press by pressurizing it. In the case with one elastomeric element at either mould end wall, these are dimensioned for together achieving the desired degree of compensation for axial strain in the press. If so desired, the elastomeric element may be dimensioned to provide an axial overcompensation of the axial elongation of the press when its elastomeric jacket is pressurized, thus to provide an axial compaction of the powder contained in the moulding cavity. The peripheral surface of the elastomeric element suitably has a diameter substantially equal to the inner diameter of the elastomeric jacket of the press. The elastomeric element may have the shape of a slab or a ring, it being essential that the element prevents direct contact between the end structure of the press and the end wall, such that in radial pressurization it varies the distance between the structure and the end wall in proportion to the radial strain in the press.

The invention is defined in the appended claims.

The invention will now be described in detail in the form of an embodiment and with reference to the accompanying drawing.

DRAWING

The FIGURE on the drawing schematically illustrates an axial section through an apparatus in accordance with the invention.

EMBODIMENT

The drawing FIGURE illustrates an isostatic press including a cylindrical jacket 1 with a fixed end structure 2 and a removable end structure 3. On its inside the jacket 1 has an elastomeric jacket 6 behind which there is an annular hydraulic chamber 7. The chamber 7 is pressurized and vented via a line 8. The structure 3 carries an elastomeric slab 31, in turn carrying an end wall 33 of a moulding tool. The structure 33 carries a core 32 and an elastomeric jacket 5.

On the inside of the fixed end structure 2 of the press there is an end wall 11 with a projection 12, which, together with the end wall 33, enveloping wall 5 and core 32 defines a mould cavity 4 intended for filling with a powder from which a pressed body is to be formed.

The elastomeric element 31 is contiguous to the radially deformable elastomeric jacket 6 of the press.

During operation the press is kept together axially by a frame (not shown) on which the end structures 2,3 are supported.

When the hydraulic chamber 7 is pressurized, the press frame is subjected to axial strain. Furthermore, the elastomeric jacket 6 moves radially inwards and exercises pressure against the elastomeric element 31. The diameter of the element 31 is then reduced, its thickness accordingly increasing. The elastomeric element 31 is dimensioned such that its increase in thickness corresponds to the strain in the press frame for a given selection of material for the elastomeric element 31.

It will be naturally understood that the element 31 may be dimensioned such as to provide overcompensation of the press frame strain so that the end wall 33 exercises an active press pressure against the powder mass in the mould cavity 4.

Although the elastomeric element 31 has been illustrated disposed between the removable end structure 3 of the press and the end wall 33 of the moulding tool built onto it, it should be quite clear that one can just as well arrange the elastomeric element 31 between the fixed press end structure 2 and the associated end wall 11.

It should also be clear that an elastomeric element can be arranged between the end structure 3 and end wall 33 as well as between the end structure 2 and the end wall 11, both elements being dimensioned such as to provide together the desired degree of compensation for the axial elastic strain of the press frame in conjunction with its pressurization and pressure unloading.

I claim:

1. Apparatus for compensating axial strain in an isostatic press during pressurization, said isostatic press acting against a moulding tool enclosed in a dry pressing chamber of the isostatic press, a mould cavity of the moulding tool being defined in the isostatic press by an elastomeric enveloping wall, a core member and two rigid end walls meeting said elastomeric enveloping wall, the dry pressing chamber of the isostatic press being defined by a radially deformable elastomeric jacket, exercising pressure against the enveloping wall of the moulding tool, and two press end structures associated with the jacket, which carry the rigid end walls of the moulding tool, wherein at least one rigid end wall is carried by an adjacent end structure via an elastomeric element and in that the elastomeric element is disposed with its peripheral edge exposed to, and lying adjacent the deformable elastomeric jacket of the pressing chamber; the elastomeric element compensating for the axial strain of the isostatic press so as to prevent relative movement between the elastomeric enveloping wall and a pressed body in the mold cavity.

2. Apparatus as claimed in claim 1, wherein one end structure and the elastomeric element constitute parts of the moulding tool, and that said tool is removable from the pressing chamber for being filled with powder or for removing the pressed body.

3. Apparatus as claimed in claim 1, wherein one end structure of the press is rigidly connected to the jacket of the press, one end wall of the tool is mounted on the fixed end structure of the press and in that the elastomeric element is arranged between the fixed end structure and the end wall of the mould adjoining it.

4. Apparatus as claimed in claim 1, wherein the elastomeric element is dimensioned for providing an axial overcompensation of the axial elongation of the press when the elastomeric jacket of the press is pressurized, for axially, actively compressing powder contained in the mould cavity.

5. Apparatus as claimed in claim 1, wherein an elastomeric element is arranged between each end wall and its adjacent press end structure.

6. Apparatus as claimed in claim 2, wherein the elastomeric element is dimensioned for providing an axial overcompensation of the axial elongation of the press when the elastomeric jacket of the press is pressurized, for axially, actively compressing powder contained in the mould cavity.

7. Apparatus as claimed in claim 3, wherein the elastomeric element is dimensioned for providing an axial over compensation of the axial elongation of the press when the elastomeric jacket of the press is pressurized, for axially, actively compressing powder contained in the mould cavity.

8. Apparatus as claimed in claim 2, wherein an elastomeric element is arranged between each end wall and its adjacent press end structure.

9. Apparatus as claimed in claim 3, wherein an elastomeric element is arranged between each end wall and its adjacent press end structure.

10. Apparatus as claimed in claim 4, wherein an elastomeric element is arranged between each end wall and its adjacent press end structure.

11. Apparatus for compensating axial strain in an isostatic press during pressurization, said isostatic press acting against a moulding tool enclosed in a dry pressing chamber of the isostatic press, a mould cavity of the moulding tool being defined in the isostatic press by an elastomeric enveloping wall, a core member and first and second end walls meeting said elastomeric enveloping wall, at least one of said end walls being rigid, the dry pressing chamber of the isostatic press being defined by a radially deformable elastomeric jacket, exercising pressure against the enveloping wall of the moulding tool, and two press end structures associated with the jacket, which carry the end walls of the moulding tool, wherein one of said first and second end walls is carried by an adjacent end structure via an elastomeric element and in that the elastomeric element is disposed with its peripheral edge exposed to, and lying adjacent the deformable elastomeric jacket of the pressing chamber; the elastomeric element compensating for the axial strain of the isostatic press so as to prevent relative movement between the elastomeric enveloping wall and a pressed body in the mold cavity.

12. Apparatus as claimed in claim 11, wherein one end structure and the elastomeric element constitute parts of the moulding tool, and wherein the first end wall, the second end wall and the elastomeric enveloping wall constitute separate parts of the apparatus and that said tool is removable from the pressing chamber for being filled with powder or for removing the pressed body.

13. Apparatus as claimed in claim 11, wherein one end structure of the press is rigidly connected to the jacket of the press, one of said first and second end walls of the tool is mounted on the rigidly connected end structure of the press and in that the elastomeric element is arranged between the rigidly connected end structure and the said mounted end wall of the mould adjoining it.

14. Apparatus as claimed in claim 11, wherein the elastomeric element is dimensioned for providing an axial overcompensation of the axial elongation of the press when the elastomeric jacket of the press is pressurized, for axially, actively compressing powder contained in the mould cavity.

15. Apparatus as claimed in claim 12, wherein the elastomeric element is dimensioned for providing an axial overcompensation of the axial elongation of the press when the elastomeric jacket of the press is pressurized, for axially, actively compressing powder contained in the mould cavity.

16. Apparatus as claimed in claim 13, wherein the elastomeric element is dimensioned for providing an axial over compensation of the axial elongation of the press when the elastomeric jacket of the press is pressurized, for axially, actively compressing powder contained in the mould cavity.

* * * * *